United States Patent [19]

Oda

[11] Patent Number: 5,140,426
[45] Date of Patent: Aug. 18, 1992

[54] IMAGE PICKUP DEVICE WITH MECHANICAL SHUTTER FOR PREVENTING SMEAR

[75] Inventor: Kazuya Oda, Tokyo, Japan

[73] Assignee: Fuji Photo Film Co., Ltd., Kanagawa, Japan

[21] Appl. No.: 592,782

[22] Filed: Oct. 4, 1990

[30] Foreign Application Priority Data

Oct. 4, 1989 [JP] Japan .................................. 1-257829

[51] Int. Cl.⁵ .............................................. H04N 5/335
[52] U.S. Cl. ............................. 358/213.24; 358/213.3; 358/213.9; 357/24
[58] Field of Search .................... 358/213.19, 213.26, 358/213.15, 213.13, 213.24, 213.27, 213.31, 213.22, 213.25; 350/24 LR; 250/332, 370.08

[56] References Cited

U.S. PATENT DOCUMENTS

| | | | |
|---|---|---|---|
| 4,686,572 | 8/1987 | Takatsu | 358/213.13 |
| 4,734,773 | 3/1988 | Ueda | 358/213.13 |
| 4,783,702 | 11/1988 | Sone et al. | 358/213.19 |
| 4,800,435 | 1/1989 | Ikeda et al. | 358/213.26 |
| 4,819,074 | 4/1989 | Suzuki | 358/213.13 |
| 4,839,734 | 6/1989 | Takemure | 358/213.26 |
| 4,853,786 | 8/1989 | Yamawaki et al. | 358/213.26 |
| 4,875,100 | 10/1989 | Yonemoto et al. | 358/213.13 |
| 4,884,142 | 11/1989 | Suzuki | 358/213.19 |
| 4,910,606 | 3/1990 | Kinoshita et al. | 358/213.26 |
| 4,985,775 | 1/1991 | Murayama et al. | 358/213.13 |

FOREIGN PATENT DOCUMENTS 1112874 5/1989 Japan .

*Primary Examiner*—Victor P. Kostak
*Assistant Examiner*—Glenton B. Burgess
*Attorney, Agent, or Firm*—Birch, Stewart, Kolasch & Birch

[57] ABSTRACT

An image pickup unit including a charge coupled solid-state image pickup device prevents the occurrence of smear. Signal charges of a picture element group corresponding to a first field are read and a mechanical shutter is thereafter closed to photo-shield the entire image pickup device when signal charges in the picture element group corresponding to a second field are held temporarily in vertical charge transfer lines.

8 Claims, 7 Drawing Sheets

IMAGE PICKUP DEVICE WITH MECHANICAL SHUTTER FOR PREVENTING SMEAR

BACKGROUND OF THE INVENTION

1. Field of the Invention

The present invention relates to an image pickup apparatus which utilizes a charge coupled solid-state image pickup device of a frame interline transfer system (FIT-CCD), and particularly relates to an image pickup apparatus having an electronic shutter function to perform picking up of an image.

2. Description of Background Art

A charge coupled solid-state image pickup device for use in such an image pickup apparatus has a structure as shown in FIG. 5.

That is, a charge coupled solid-state image pickup device is constituted by a drain portion 1 for discharging unnecessary electric charges, a photo-detection portion 2 for photo-detecting an optical image of a subject, a storage portion 3 for temporarily holding signal charges for every picture element produced in the photo-detection portion 2, and a horizontal charge transfer line 4 for reading out the signal charges in the store portion 3. The charge coupled solid-state image pickup device is formed by a semiconductor production technique.

Further, describing the structures of the respective portions, first, in the photo-detection portion 2, a plurality of photo-diodes are arranged in a matrix in vertical and horizontal scanning directions V and H. For example, in the case of a primary color stripe filter, as shown in FIG. 3, color filters of red (R) are laminated on the respective surfaces of a group of photo-diodes arranged in the first column, color filters of green (G) are laminated on the respective surfaces of a group of photo-diodes arranged in the second column, and color filters of blue (B) are laminated on the respective surfaces of a group of photo-diodes arranged in the third column. These three columns are arranged repeatedly in the horizontal scanning direction H. The photo-diodes correspond to the respective picture elements. Assuming that these photo-diodes are arranged in M rows (M is an even number) in the vertical scanning direction V, a photo-diode group in an odd numbered row numbered from the side of the drain portion 1 is regarded as a first field, and a photo-diode group in an even numbered row is regarded as a second field.

Vertical charge transfer lines $l_1$ to $l_N$ are formed adjacently to photo-diode groups in the respective columns. Four-phase driving signals $\phi I1$, $\phi I2$, $\phi I3$ and $\phi I4$ are applied to a transfer electrode group (not shown) laminated on the upper surfaces of the vertical charge transfer lines so as to produce transfer elements to transfer signal charges in the vertical scanning direction V. Further, photo-shield layers are formed on the upper surfaces of all the vertical charge transfer lines $l_1$ to $l_N$ to prevent light from striking the surfaces.

Further, transfer gates (for example, shown as represented by TG in FIG. 5) are provided between respective photo-diodes and charge transfer elements in vertical charge transfer lines adjacent thereto, for conducting and therefore transferring signal charges produced in the respective photo-diodes to the charge transfer elements in the vertical charge transfer lines. Gate electrodes for driving the transfer gates are formed integrally with the transfer electrodes in the vertical charge transfer lines, and the transfer gates are set in a conductive state by setting driving signals to a high voltage at a predetermined timing.

The drain portion 1 is constituted by a predetermined impurity layer formed so as to connect with one end of all the vertical charge transfer lines $l_1$ to $l_N$, for transferring unnecessary charges transferred through the vertical charge transfer lines, to a semiconductor substratum.

The storage portion 3 is constituted by a charge transfer line group provided continuously with the other ends of all the vertical charge transfer lines $l_1$ to $l_N$. Four-phase driving signals $\phi S1$, $\phi S2$, $\phi S3$ and $\phi S4$ are applied to a transfer electrode group (not shown) laminated on the upper surfaces of the vertical charge transfer lines so as to function to transfer signal charges from the photo-detection portion 2 in the vertical scanning direction V and hold the signal charges in a predetermined charge transfer element group by stopping the driving signals temporarily. It is therefore possible to produce a transfer element group to temporarily hold signal charges produced in photo-diodes of M/2 lines (that is, one field). Further, photo-shield layers are formed on the upper surfaces of all the vertical charge transfer lines to prevent light from striking the upper surfaces.

The horizontal charge transfer line 4 is connected with the ends of all the charge transfer lines of the storage portion 3 so as to transfer signal charges in the horizontal scanning direction H synchronously with two-phase driving signals $\phi H1A$ and $\phi H2$ applied to a transfer electrode group (not shown) formed on the upper surface of the horizontal charge transfer line 4. The signal charges transferred synchronously with the two-phase driving signals $\phi H1A$ and $\phi H2$ are impedance-converted in a floating diffusion amplifier 5 synchronously with a reset signal $\phi Rs$ and an output gate signal $\phi H1B$, and are supplied to an output terminal 6 as a color signal every picture element.

FIG. 6 shows image pickup timing when respective fields are read in an electronic still camera or the like having an electronic shutter function.

Assume that a shutter release button of an electronic still camera is pushed at a point of time t1 in FIG. 6. Then, synchronously with the pushing of the shutter release button, four-phase driving signals $\phi I1$, $\phi I2$, $\phi I3$ and $\phi I4$ are set at predetermined voltage levels respectively so as to make only transfer gates corresponding to a first field conductive, so that unnecessary charges in a photo-diode group corresponding to the first field are transferred to vertical charge transfer lines.

Next, at a point of time t2 after a predetermined period $\tau 0$ has elapsed from the point of time t1, the four-phase driving signals $\phi I1$, $\phi I2$, $\phi I3$ and $\phi I4$ are set at predetermined voltage levels respectively so as to make only transfer gates corresponding to a second field conductive so that unnecessary charges in a photo-diode group corresponding to the second field are transferred to the vertical charge transfer lines.

After unnecessary residual charges in all the photo-diodes are transferred to the vertical charge transfer lines by those transfer operations at the points of time t1 and t2, in a predetermined period $\tau 1$ from a point of time t3 to a point of time t4, the vertical charge transfer lines of the photo-detection portion 2 and the charge transfer lines of the storage portion 3 transfer all the unnecessary charges to the side of the drain portion 1 synchronously with driving signals $\phi I1$ through $\phi I4$ and φS1 through φS4 to thereby discharge the unnecessary charges.

Next, at a point of time t5 immediately after an exposure period τ3 established in accordance with the shutter speed has elapsed, the same charge transfer processing as that at the point of time t1 is performed. That is, the exposure period of respective photo-diodes corresponding to a first field is from the point of time t1 till the point of time t5, the point of time t1 being that when the four-phase driving signals φI1, φI2, φI3 and φI4 are set at predetermined voltage levels respectively so as to make only transfer gates corresponding to a first field conductive so that signal charges in a photo-diode group corresponding to the first field are transferred to the vertical charge transfer lines to thereby discharge signal charges.

Next, in a predetermined period τ4 from a point of time t6 till a point o time t7, the vertical charge transfer lines $l_1$ through $l_N$ of the photo-detection portion 2 and the charge transfer lines of the storage portion 3 perform a charge transfer operation at a high speed synchronously with the driving signals φI1 through φI4 and φS1 through φS4, so as to transfer signal charges corresponding to the first field onto the charge transfer lines of the storage portion 3.

Next, the same charge transfer processing as that at the point of time t2 is performed at a point of time t8 immediately after an exposure period τ5 (here, τ5=τ3) established in accordance with the shutter speed has elapsed from the point of time t2 when unnecessary charges in the photo-diode group corresponding to the second field are discharged. That is, the exposure period of respective photo-diodes corresponding to a second field is from the point of time t2 till the point of time t8, the point of time t2 being that when the four-phase driving signals φI1, ,φI2, φI3 and φI4 are set at predetermined voltage levels respectively so as to make only transfer gates corresponding to a second field conductive so that signal charges in a photo-diode group corresponding to the second field are transferred to the vertical charge transfer lines to thereby discharge signal charges.

Next, in a predetermined period τ6 from a point of time t9 till a point of time t10, the transfer operation of the vertical charge transfer lines $l_1$ through $l_N$ in the photo-detection portion 2 is stopped so that the signal charges corresponding to the second field are held in those vertical charge transfer lines, and at the same time, the storage portion 3 and the horizontal charge transfer line 4 are made to perform a charge transfer operation at a predetermined timing so that only the signal charges corresponding to the first field are read out to an output terminal 6.

Next, in a predetermined period τ7 from a point of time t11 till a point of time t12, the vertical charge transfer lines of the photo-detection portion 2 and the charge transfer lines of the storage portion 3 perform a charge transfer operation at a high speed synchronously with the driving signals φI1 through φI4 and S1 through φS4, so as to transfer signal charges corresponding to the second field onto the charge transfer lines of the storage portion 3.

Next, in a predetermined period τ8 from a point of time t13 till a point of time t14, the storage portion 3 and the horizontal charge transfer line 4 perform a charge transfer operation at a predetermined timing so that the signal charges corresponding to the second field are read out to the output terminal 6.

As has been described, by performing read-out scanning as shown in FIG. 6, it is possible to obtain an artificial frame electronic shutter function having an exposure period from the point of time of a reset operation (the point of time when unnecessary charges are discharged) till the point of time when read-out scanning for every field is started.

However, since signal charges corresponding to a second field are read out after signal charges corresponding to a first field are read, as shown in the period of τ6 in FIG. 6, the signal charges corresponding to the second field are held in vertical charge transfer lines temporarily, so that a smear is mixed in the signal charges corresponding to the second field in this holding period (if in accordance with a standard television system, 1/60 second, that is, 16.7 mS). Accordingly, if a frame picture is reproduced on the basis of these read signals, there has been a problem that field flicker is produced between reproduced pictures of the first and second fields due to the luminance difference of smear components thereof. Moreover, in such a case where a subject having a spot-shaped portion of high light intensity is to be photographed, there has been a problem wherein blooming is produced since a plurality of smears are produced which overflow into the vertical charge transfer lines when the signal charges corresponding to the second field are being held in the vertical charge transfer lines.

Further, with increased shutter speed the influence of smear mixing increases. FIG. 7 is a diagram of a characteristic curve showing a level ratio by percent (smear mixing ratio) between picture signals read-out from first and second fields for every color according to the shutter speed when one and the same subject is taken. As shown in FIG. 7, the light intensity to a photo-detection portion increases as the shutter speed becomes high so that generation of smear increases. If the ratio of a smear component of a second field to a first field reaches more than about 1 percent, flicker can be recognized by human eyes so that deterioration of picture quality results.

Conventionally, therefore, it has been considered to provide an image pickup apparatus in which smear is prevented from occurring by partial use of a mechanical shutter with an electronic shutter.

This apparatus includes a mechanical shutter provided corresponding with the photo-detection surface side of a solid-state image pickup device, similar to that shown in FIG. 5, so that an electronic shutter starts the opening of the shutter and a mechanical shutter closes the shutter. In this technique, there is provided a so-called VOD by which unnecessary charges in photodiodes constituting picture elements can be discharged to a semiconductor substrate side. Described on the basis of a timing diagram shown in FIG. 8, first, a mechanical shutter is made to be in an opened state so as to radiate an optical image of a subject onto a photo-detection surface of a solid-state image pickup device, and all the unnecessary charges are discharged to the semiconductor substrate side through the VOD structure in a predetermined short period τ1 from a point of time t1 synchronized with the pushing operation of a shutter release button.

Next, the mechanical shutter is closed at a point of time t3 immediately after the lapse of an exposure period τ2 established in accordance with the shutter speed from a point of time t2 when discharge of unnecessary charges is completed. Therefore, photo-diodes of the first and second field have the same timing and the same exposure period τ2.

Next, the same read-out scanning as that after the point of time t5 in FIG. 6 is performed (in processing after the point of time t5 in FIG. 8, the same points of time as those in FIG. 6 are referenced correspondingly).

Therefore, in the read-out scanning after the shutter is closed, the solid image pickup device is photoshielded perfectly by the mechanical shutter, so that smears are not mixed in at all, and the problems of field flicker and the like can be solved.

However, in such a conventional image pickup apparatus using a mechanical shutter together with an electronic shutter, there has been a problem that high shutter precision cannot be obtained unless the mechanical shutter can perform a closing operation at an extremely high speed. That is, when a mechanical shutter in an opened state is closed at a certain point of time, the shutter does not close immediately, but photo-shield is achieved by the gradual movement of a photo-shield plate of the shutter from one end side to the other end side. Therefore, as shutter speed is higher, greater photo-shield precision of the mechanical shutter is required.

SUMMARY OF THE INVENTION

It is therefore an object of the present invention to solvent the foregoing problems in the prior art.

It is another object of the present invention to provide an image pickup apparatus in which flicker and blooming generated by smear mixing can be eliminated, and at the same time, image pickup can be performed at a high shutter speed by use of a comparatively low speed mechanical shutter.

In order to attain the foregoing objects, the present invention is directed to an image pickup apparatus in which a charge coupled solid-state image pickup device of a frame interline transfer system is used as an image sensor, and a mechanical shutter is provided in front of a photo-detection surface of the charge coupled solid-state image pickup device.

According to an aspect of the present invention, the image pickup apparatus in which unnecessary charges are discharged, picture signals of a picture element group corresponding to a first field are read out by interlaced scanning reading-out immediately after the lapse of an exposure period corresponding to the shutter speed, and then picture signals of a picture element group corresponding to a second field are read out, so that an artificial electronic shutter function is realized, has a feature that exposure is performed in the state where the above-mentioned mechanical shutter is in the opened state from the above-mentioned point of time of discharging the unnecessary charges, and the mechanical shutter is closed at a proper point of time in the period of the above-mentioned scanning reading-out of the signal charges of the picture element group corresponding to the second field in the above-mentioned interlaced scanning reading-out.

According to the image pickup apparatus including such a mechanism according to the present invention, the mechanical shutter is closed to photo-shield the whole of the image pickup device perfectly in the period where the signal charges in the picture element group corresponding to the second field are being held in the vertical charge transfer lines temporarily because the signal charges in the picture element group corresponding to the first field are read-out in advance, so that it is possible to prevent smears from occurring. Moreover, since the shutter function to establish an exposure field is performed by the electronic shutter and the mechanical shutter is closed for the purpose of photo-shield after artificial closing is performed by the electronic shutter, the shutter precision does not depend on the mechanical shutter, so that it is possible to obtain high shutter precision by the electronic shutter. Further, since operation goes well only if the mechanical shutter is closed at a proper point of time (within a period where the signal charges in the picture element group corresponding to the second field are being held in the vertical charge transfer lines temporarily) after the operation of the electronic shutter, it is possible to use a simple mechanical shutter having no high speed characteristic.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will be apparent from the following description taken in connection with the accompanying drawings which are given by way of illustration only, and thus are not limitative of the present invention, and wherein.

DETAILED DESCRIPTION OF THE PREFERRED EMBODIMENTS

Figure 1:
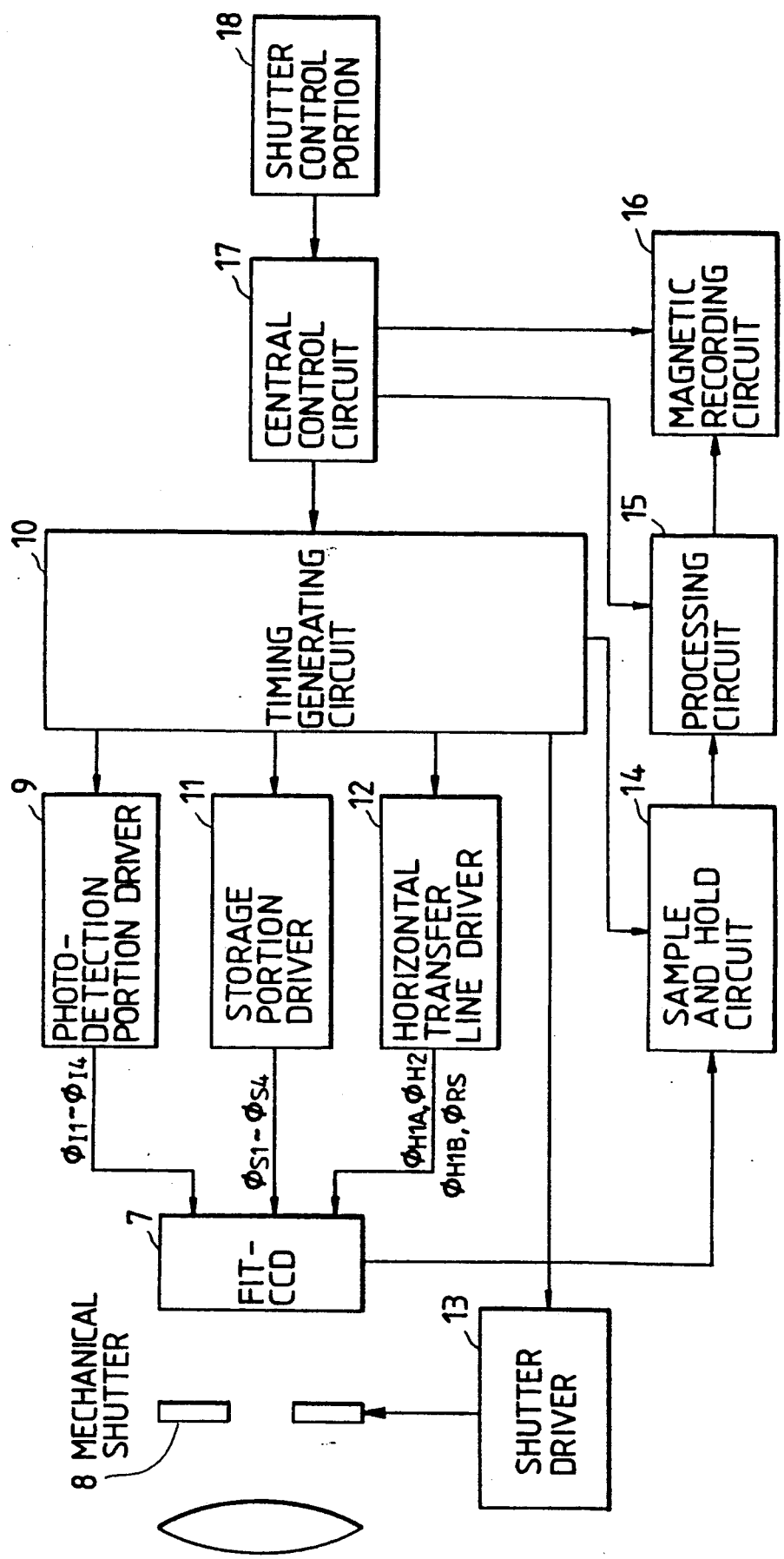
FIG. 1 is a diagram illustrating the configuration of an embodiment of the present invention.
Figure 5:
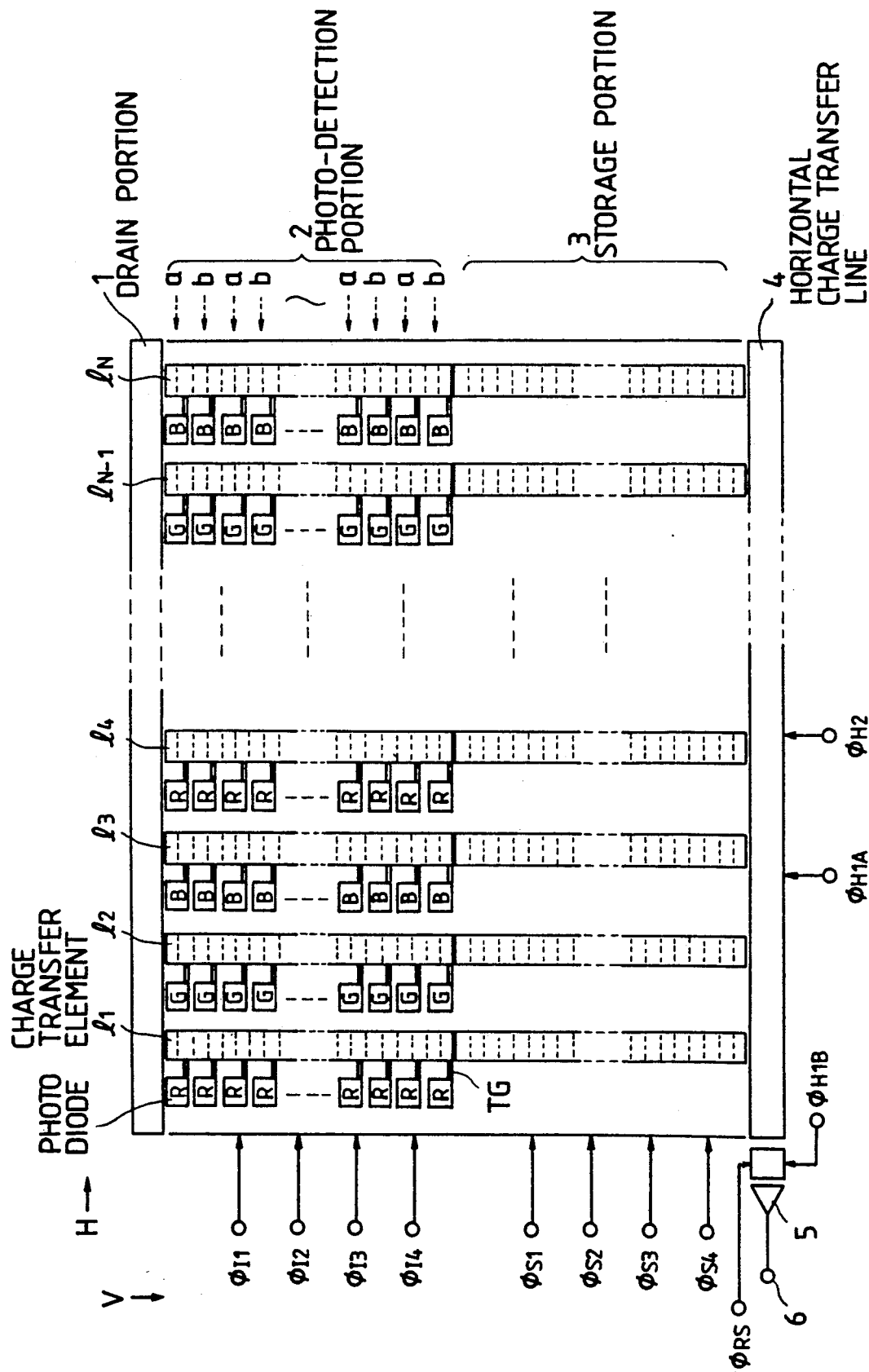
FIG. 5 is a diagram illustrating the configuration of a charge coupled solid-state image pickup device of a frame interline transfer system.
Figure 6:
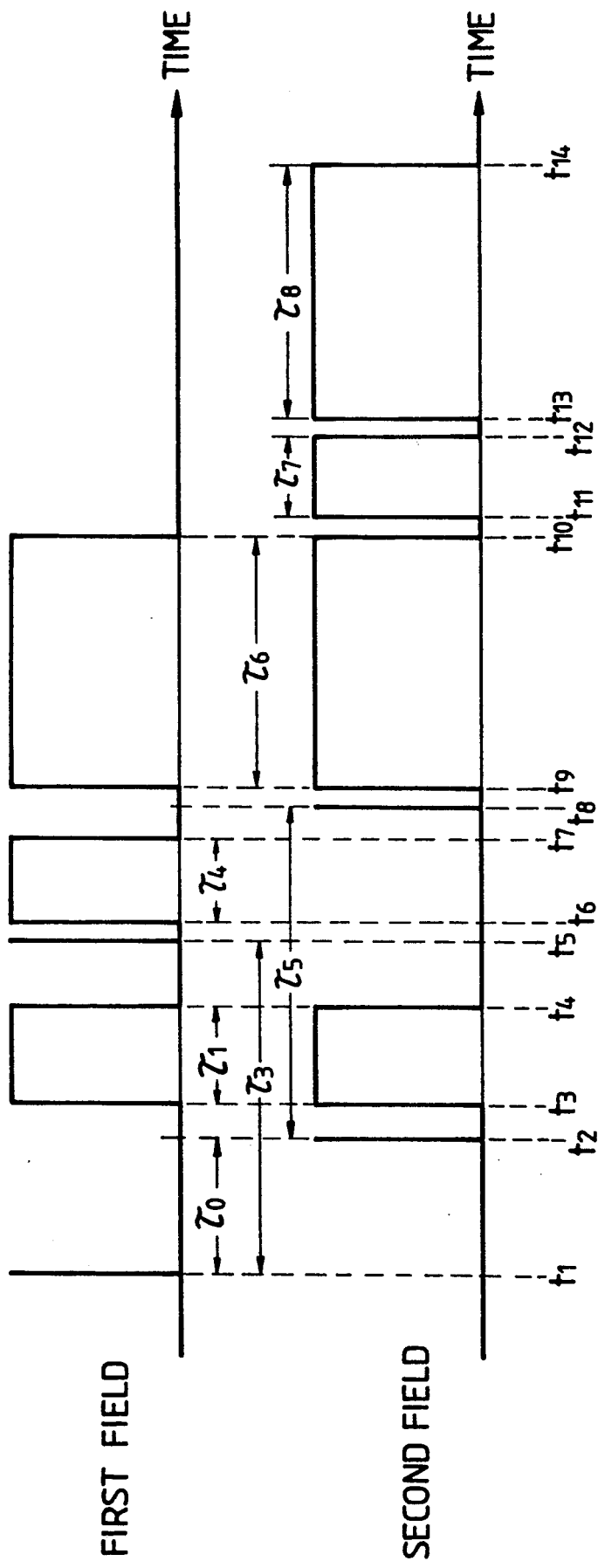
FIG. 6 is a diagram illustrating the function of a conventional artificial electronic shutter.
Figure 7:
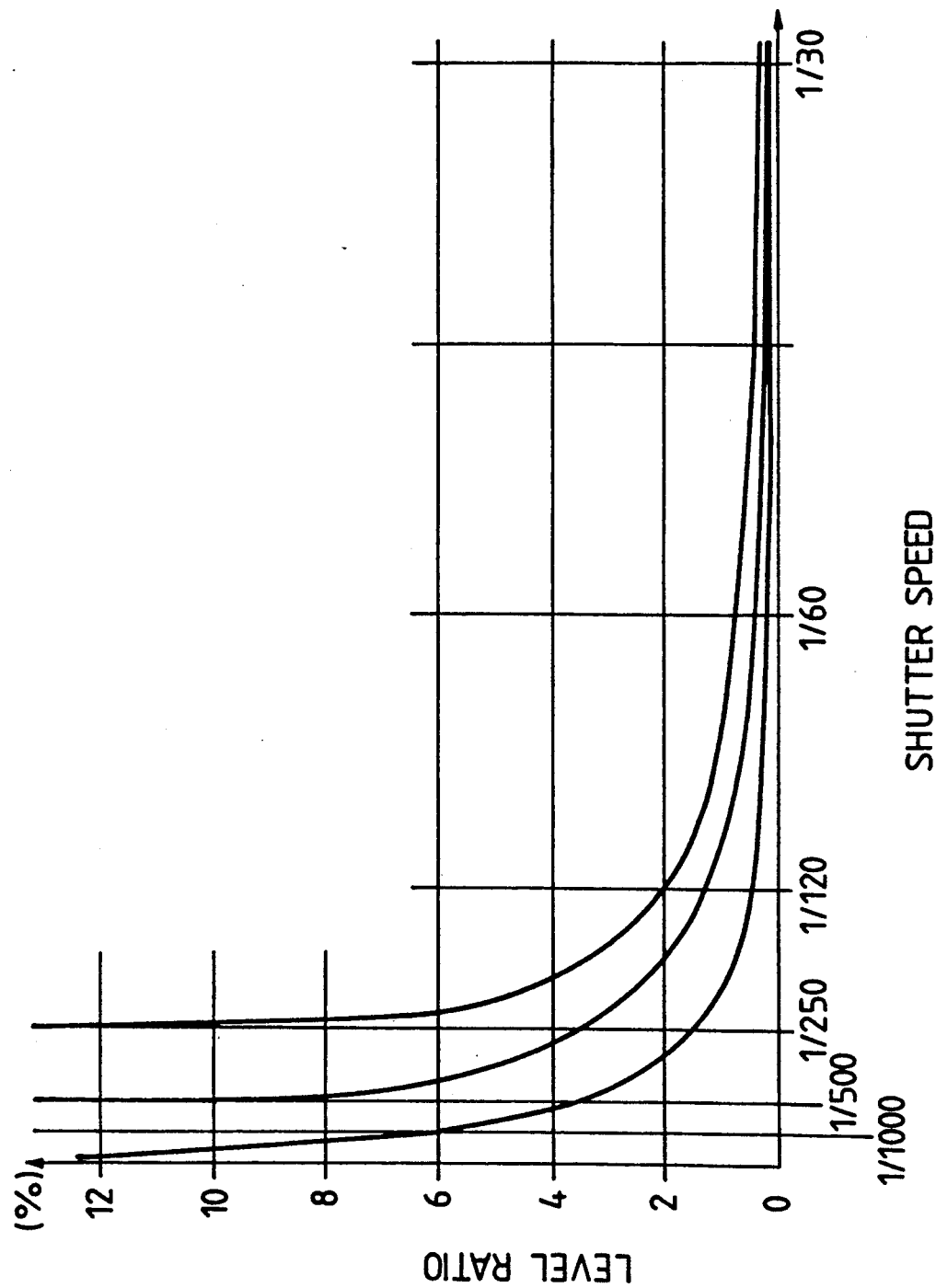
FIG. 7 is a characteristic curve diagram illustrating a smear production characteristic of a conventional artificial electronic shutter.
Figure 8:
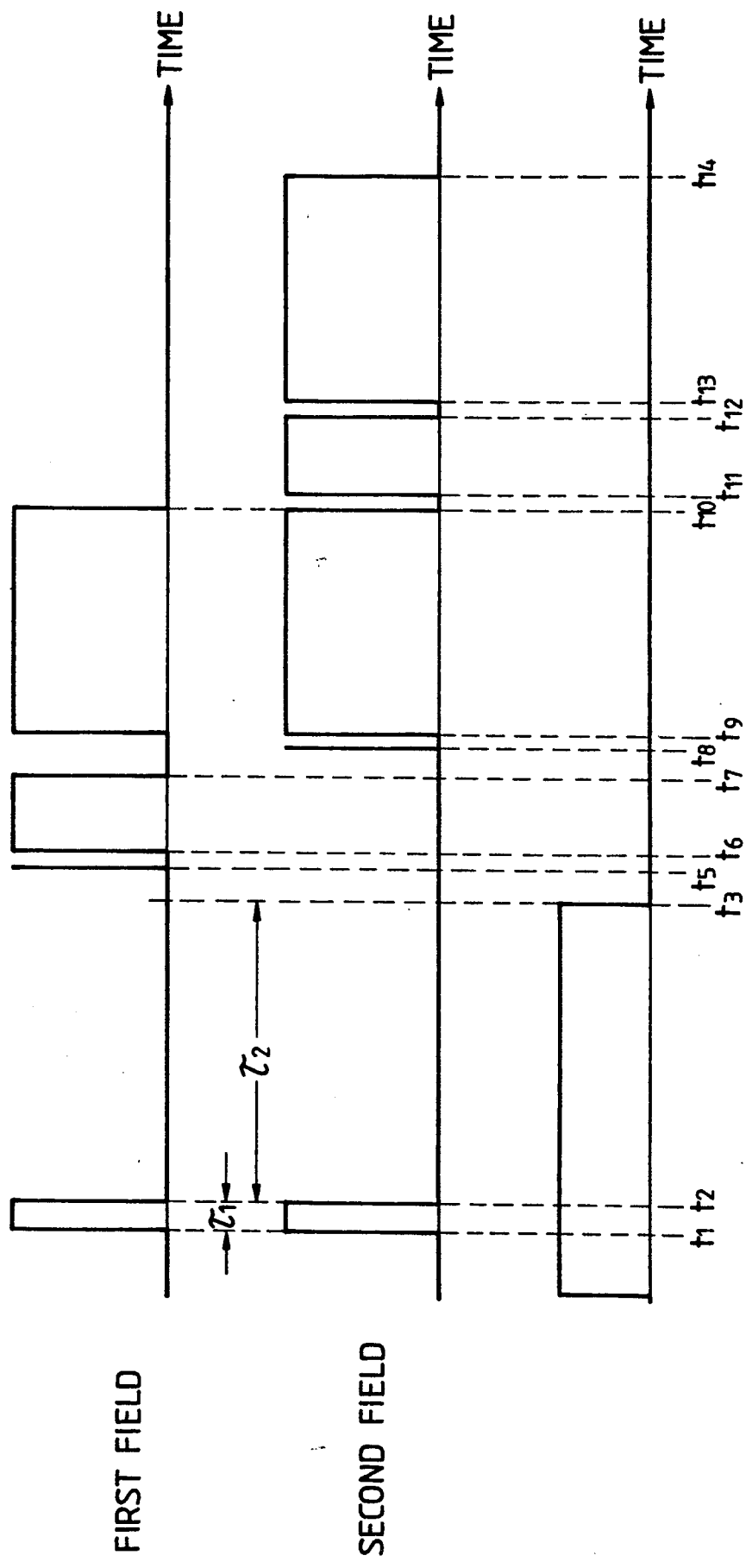
FIG. 8 is an operational diagram illustrating another example of the conventional technique.

An embodiment of the present invention will be described with reference to FIG. 1. FIG. 1 shows the structure of an image pickup apparatus in an electronic still camera. As an image pickup device, an FIT-CCD the same as that illustrated in FIG. 5 is utilized.

First, the structure will be described. In FIG. 1, the reference numeral 7 represents a charge coupled solid-state image pickup device of a frame interline transfer system (FIT-CCD). In the same manner as that shown in FIG. 5, a red (R), blue (B) and green (G) stripe color filter is formed on the photo-detection surface of the image pickup device 7 to detect an optical image of a subject.

The reference numeral 8 represents a mechanical shutter disposed in an image pickup optical system positioned in front of the image pickup device 7. The mechanical shutter 8 has a diaphragm function and is disposed at an afocal position.

The reference numeral 9 represents a photo-detection portion driver which produces four-phase driving signals φI1 through φI4 for driving vertical charge transfer lines in a photodetection portion (see FIG. 5) of the charge coupled solid-state image pickup device 7 synchronously with a synchronizing signal from a timing generating circuit 10.

The reference numeral 11 represents a storage portion driver which produces four-phase driving signals φS1 through φS4 for driving charge transfer lines in a storage portion (see FIG. 5) synchronously with a synchronizing signal from the timing generating circuit 10.

The reference numeral 12 represents a horizontal transfer line driver which produces two-phase driving signals φH1A and φH2 for driving a horizontal charge transfer line (see FIG. 5), a gate signal φH1B for driving a gate, and a reset signal RS synchronously with a synchronizing signal from the timing generating circuit 10.

The reference numeral 13 represents a shutter driver which performs the establishment of diaphragm quantity of the mechanical shutter 8 and the opening and closing operation of a shutter on the basis of an instruction from the timing generating circuit 10.

The reference numeral 14 represents a sample and hold circuit which samples color signals supplied through the horizontal charge transfer line (see FIG. 5) by means of a correlation double sampling system synchronously with a timing signal from the timing generating circuit 10.

The reference numeral 15 represents a processing circuit which performs a processing such as white balance adjustment or γ-correction upon picture element color signals supplied from the sample and hold circuit 14, and then forms and outputs a luminance signal and a color difference signal.

The reference numeral 16 represents a magnetic recording circuit which FM-modulates the luminance signal and the color difference signal supplied from the processing unit 19 and records the FM-modulated signals in a recording medium such as a magnetic disk or the like.

The reference numeral 17 represents a central control circuit constituted by a microprocessor and so on, and the central control circuit 17 controls the operation timing of the whole of the apparatus.

The reference numeral 18 represents a shutter control portion which supplies the central control circuit 17 with a signal indicating the fact that an operator has pushed a shutter release button so as to start a series of image pickup operations with an electronic shutter function.

Figure 2:
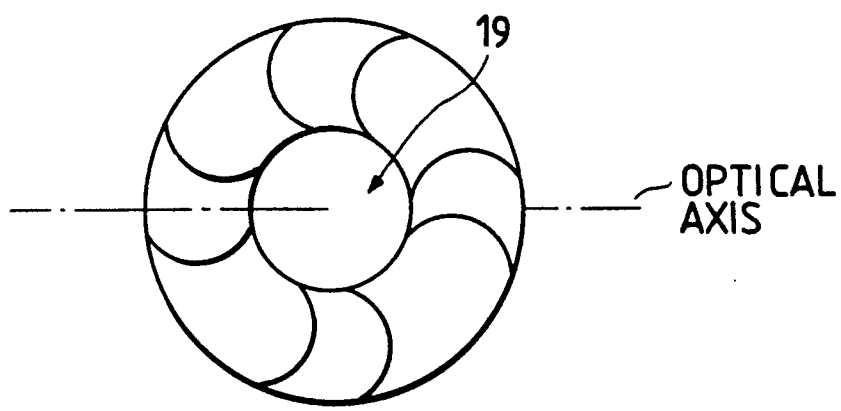
FIGS. 2 and 3 are diagrams illustrating the structure of a mechanical shutter.
Figure 3:
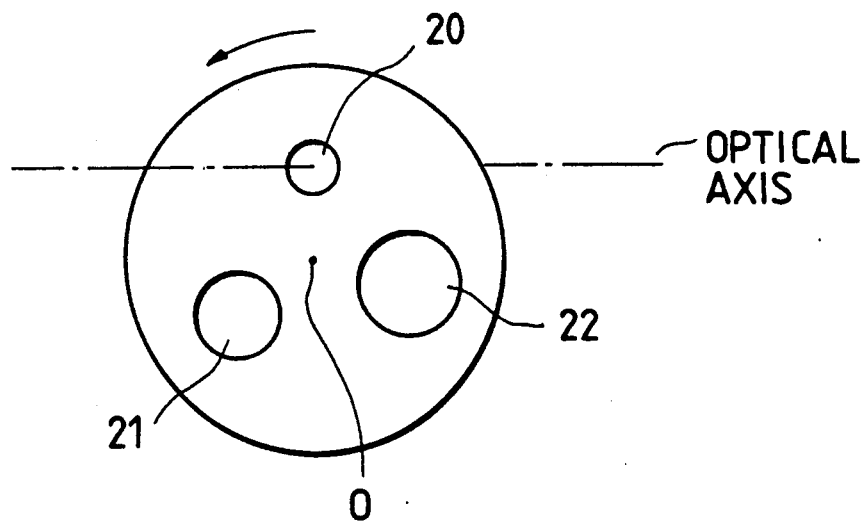

The mechanical shutter 8, for example, is a mechanical shutter having a structure in which an opening portion 19 made to be in alignment with an optical axis is driven so that a plurality of blade members thereof are closed/opened to thereby set the quantity of diaphragm and perform the opening/closing operation as shown in FIG. 2. In the alternative, a mechanical shutter having a structure in which a plurality of opening portions 20 through 22 having different opening areas are formed on one and the same circumference around a predetermined center O. The respective opening portions are selected so as to correspond with a set diaphragm, and the opening portions are rotated around the center O so as to perform shutter opening and closing as shown in FIG. 3. The mechanical shutters mentioned above are mere examples, and any mechanical shutter having another structure may be used.

Figure 4:
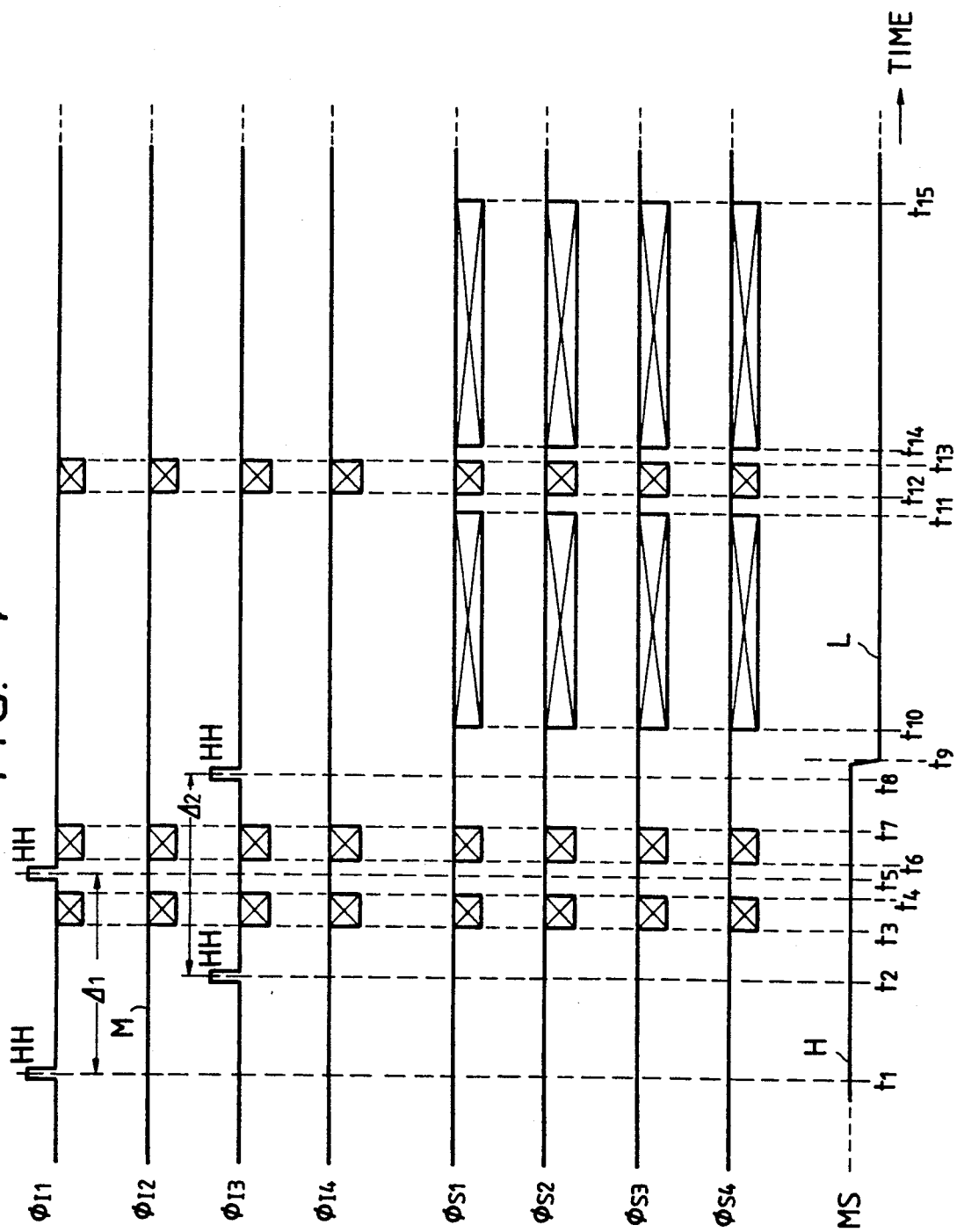
FIG. 4 is a timing chart for explaining the operation of the embodiment of FIG. 1.

Next, the operation of the embodiment having such a configuration will be described on the basis of a timing chart shown in FIG. 4. Assume that an operator pushes a shutter release button at a certain point of time after the operator has set the shutter speed T in the shutter control portion 18.

When a shutter release button is pushed, an instruction to start picking up an image is given to the central control circuit 17 from the shutter control portion 18 synchronously with shutter release button activation, and the data $D_T$ of the shutter speed designated by an operator is held in the central control circuit 17. If the shutter release button is pushed further, the quantity of diaphragm of the mechanical shutter 8 is set to an optimum value corresponding to the shutter speed and the shutter 8 is made to be in an opened state. In FIG. 4, the opened and closed states of the mechanical shutter 8 are designated by MS="H" and MS="L" respectively.

Further, synchronously with shutter release button activation, a charge transfer mode for a first field is established at the point of time t1, and of the four-phase driving signals, only the driving signal φI1 is set to an "HH" level while the rest of the driving signals φI2, φI3 and φI4 are left in an "M" level (a voltage for producing a transfer element in a vertical charge transfer line) so that a transfer gate corresponding to a first field is made conductive (that is, the potential level thereof is made deeper than that of a photo-diode) so as to transfer unnecessary charges in all the photo-diodes of the first field to a transfer element of an adjacent vertical charge transfer line. At the same time, the horizontal charge transfer line starts a charge transfer operation so as to discharge unnecessary charges in the horizontal charge transfer line outside through a floating diffusion amplifier within a predetermined period.

Next, the charge transfer mode for the first field is switched to that for a second field, and only the driving signal φI3 is set to a high voltage level "HH" at a point of time t2 so that a transfer gate corresponding to a second field is made conductive so as to transfer unnecessary charges in all the photo-diodes in the second field to a transfer element in an adjacent vertical charge transfer line.

Through these transfer operations at the points of time t1 and t2, unnecessary residual charges in all the photo-diodes are transferred to the vertical charge transfer lines.

Next, in a predetermined period (from a point of time t3 to a point of time t4 in the drawing) in a vertical fly-back period, the vertical charge transfer lines of the photo-detection portion and the charge transfer lines of the storage portion transfer unnecessary charges to a drain portion 1 side synchronously with the driving signals φI1 through φI4 and φS1 through φS4 to thereby discharge those unnecessary charges Next, at a point of time t5 when the discharge operation of all the unnecessary charges is completed, the charge transfer mode for the second field is switched to that for a first field again, the driving signal φI1 is set to a high voltage level "HH" in the same manner as at the point of time t1, so that a transfer gate corresponding to a first field is made conductive so as to transfer charges in all the photo-diodes in the first field to a transfer element in an adjacent vertical charge transfer line. That is, a period Δ1 from the point of time of making the transfer gate non-conductive after the point of time t1 till the point of time t5 of making the transfer gate conductive again is an exposure time of a photo-diode group corresponding to the first field.

Next, by a high speed charge transfer operation in a predetermined period (from a point of time t6 to a point of time t7 in the drawing), signal charges in the vertical charge transfer lines are transferred to the charge transfer lines of the storage portion. When this transfer operation is completed, all the signal charges of the photo-diode group corresponding to the first field are held by the storage portion.

Next, the charge transfer mode for the first field is switched to that for a second field again, and the driving signal $\phi I3$ is set to a high voltage level "HH" at a point of time t8 after the lapse of the period $\Delta 2$ from the point of time t2, so as to make a transfer gate corresponding to a second field conductive, so as to transfer charges in all the photo-diodes in the second field to a transfer element in an adjacent vertical charge transfer line. That is, the period $\Delta 2$ from the point of time of making the transfer gate non-conductive immediately after the point of time t2 till the point of time t8 of making the transfer gate conductive again is an exposure time of a photo-diode group corresponding to the second field. The operation timing is controlled so that the exposure time $\Delta 1$ for the first field is equal to the exposure time $\Delta 2$ for the second field.

Next, at a proper point of time t9 immediately after the point of time t8, the mechanical shutter 8 is closed and the closed state is kept so as to photo-shield the image pickup device 7 perfectly.

Next, in the read-out scanning period from a point of time t10 to a point of time t11, while the signal charges corresponding to the second field are left stopped in the vertical charge transfer lines, the signal charges corresponding to the first field in the storage portion are vertical-charge-transferred to the horizontal charge transfer line, and at the same time, the horizontal charge transfer line performs horizontal charge transfer for every vertical charge transfer of one horizontal line so as to output time series signals. The sample and hold circuit 14 samples the outputted time series signals synchronously with a predetermined timing so as to output picture element signals. After various corrective processings are performed in the processing circuit 15, the signal charges are recorded in the magnetic recording circuit 16.

Next, after completion of reading-out the signal charges corresponding to the first field in the storage portion, signal charges corresponding to the second field held in the vertical charge transfer lines of the photo-detection portion are transferred to the storage portion in a period from a point of time t12 to a point of time t13.

Next, in a read-out scanning period from a time point t14 to a point of time t15, the signal charges corresponding to the second field in the storage portion are vertical-charge-transferred to the horizontal charge transfer line, and at the same time, the horizontal charge transfer line performs horizontal charge transfer for every vertical charge transfer of one horizontal line, so as to output color signals corresponding to respective picture elements.

As has been described, after signal charges corresponding to first and second fields are transferred to vertical charge transfer lines and a storage portion, photo-shielding is performed by a mechanical shutter, and signal charges are read-out during this photo-shielding by means of the mechanical shutter, so that smears are prevented from occurring even if the signal charges corresponding to the second field are held in the vertical charge transfer lines temporarily, and it is therefore possible to prevent field flicker and blooming from occurring.

Moreover, the mechanical shutter is not for defining ordinary opening and closing of a shutter, and if the mechanical shutter is closed at a proper point of time in a period (about 16.7 mS, according to the standard television system) when the signal charges corresponding to the second field are being held in the vertical charge transfer lines after being transferred thereto from a picture element group, it is possible to reduce the mixture of smears, so that a comparatively low speed and simple mechanical shutter can be employed, and operation control can be made extremely easy. Of course, if the mechanical shutter is closed as immediately as possible after the signal charges corresponding to the second field are transferred from a picture element group to the vertical charge transfer lines, mixture of smears is further reduced, but even if not so, in comparison with the shutter operation by means of an artificial electronic shutter only, extreme improvement is possible.

As has been described above, according to the present invention, because signal charges in a picture element group corresponding to a first field are read in advance, a mechanical shutter is closed to photo-shield the whole of an image pickup device perfectly when signal charges in a picture element group corresponding to a second field are being held in vertical charge transfer lines temporarily, so that it is possible to prevent smears from occurring. Moreover, since a shutter function to establish an exposure period is performed by an electronic shutter perfectly and a mechanical shutter is closed for the purpose of photo-shielding after artificial closing is performed by the electronic shutter, shutter precision does not depend on the mechanical shutter, so that it is possible to obtain high shutter precision by means of the electronic shutter.

Further, since it suffices that the mechanical shutter is closed at a proper point of time after the operation of the electronic shutter, it is possible to employ a simple mechanical shutter which requires no high speed characteristic.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of operating an image pickup apparatus comprising the steps of:
   activating a shutter release button to open a mechanical shutter according to a predetermined shutter speed;
   transferring residual charges in photodiodes of a first field to corresponding transfer elements of adjacent vertical charge transfer lines, during a first charge transfer mode, in synchronism with said activation of the shutter release button;
   transferring residual charges in photodiodes of a second field to corresponding transfer elements of the adjacent vertical charge transfer lines during a second charge transfer mode;

transferring the residual charges from the adjacent vertical charge transfer lines and unnecessary charges in storage charge transfer lines, during a drain transfer mode, to a drain portion of the image pickup apparatus;

transferring signal charges accumulated in the photodiodes of the first field during a first exposure period, extending from immediately after lapsing of said first charge transfer mode to a point in time subsequent lapsing of said drain transfer mode, to the corresponding transfer elements of the adjacent vertical charge transfer lines;

transferring accumulated signal charges of the first field from the adjacent vertical charge transfer lines, during a storage transfer mode, to the storage charge transfer lines;

transferring signal charges accumulated in the photodiodes of the second field during a second exposure period, extending from immediately after lapsing of said second charge transfer mode to a point in time subsequent said storage transfer mode, to the corresponding transfer elements of the adjacent vertical charge transfer lines; and preventing the occurrence of smear by closing the mechanical shutter;

reading out accumulated signal charges of the first field from the storage charge transfer lines to output time series picture element signals of the first field;

transferring accumulated signal charges of the second field from the adjacent vertical charge transfer lines to the storage charge transfer lines; and reading out accumulated signal charges of the second field from the storage charge transfer lines to output time series picture element signals of the second field.

2. The method of operating an image pickup apparatus of claim 1, wherein said reading out of the accumulated signal charges comprises transferring accumulated signal charges from the storage charge transfer lines to a horizontal charge transfer line to output the time series picture element signals.

3. A method of operating an image pickup apparatus to prevent the occurrence of smear comprising the steps of:

activating a shutter release button to open a mechanical shutter;

transferring residual charges of photodiodes of first and second fields to corresponding transfer elements of adjacent vertical charge transfer lines and subsequently to a drain portion of the image pickup apparatus;

transferring signal charges accumulated during a first exposure period from the photodiodes of the first field to corresponding transfer elements of the adjacent vertical charge transfer lines and subsequently to storage charge transfer lines;

transferring signal charges accumulated during a second exposure period from the photodiodes of the second field to corresponding transfer elements of the adjacent vertical charge transfer lines; and reading out accumulated signal charges of the first field from the storage charge transfer lines and subsequently reading out accumulated signal charges of the second field transferred from the adjacent vertical charge transfer lines to the storage charge transfer lines to form time series picture element signals, said mechanical shutter being opened in response to activation of the shutter release button and being closed immediately after completion of the transfer of the accumulated signal charges of the second field to the adjacent vertical charge transfer lines to prevent the occurrence of smear.

4. The method of operating an image pickup apparatus of claim 3, wherein said reading out of accumulated signal charges further comprises transferring accumulated signal charges from the storage charge transfer lines to a horizontal charge transfer line to output the time series picture element signals.

5. An image pickup apparatus comprising:

photodiode elements, coupled to corresponding transfer elements of vertical charge transfer elements, for accumulating signal charges of an image of interest, said photodiode elements grouped to correspond to first and second fields;

storage charge transfer elements, coupled to said vertical charge transfer elements, for storing accumulated signal charges of said first and second fields;

a horizontal charge transfer line, coupled to said storage charge transfer elements, for transferring accumulated signal charges from said storage charge transfer elements in a horizontal scanning direction to form time series picture element signals of said first and second fields;

timing generating means, operatively coupled to said vertical charge transfer elements, said storage charge transfer elements, and said horizontal charge transfer line, for synchronizing operation thereof to sequentially transfer accumulated signal charges of said first field to said vertical charge transfer elements and subsequently to said storage charge transfer elements, transfer accumulated signal charges of said second field to said vertical charge transfer elements, and transfer said accumulated signal charges of said first and second fields to said horizontal charge transfer line;

control means, coupled to said timing generating means, for controlling operation of the image pickup apparatus; and shutter release means, operatively coupled to said control means, for directing said control means to open a shutter means to expose said photodiode elements, said control means operative to open said shutter means for a period of time extending from activation of said shutter release means to a point immediately after completion of transfer of said accumulated signal charges of said second field to said vertical charge transfer elements to prevent smear.

6. The image pickup apparatus of claim 5, further comprising a drain portion, coupled to said vertical charge transfer elements, for discharging residual signal charges accumulated in said photodiode elements, said vertical charge transfer elements, and said storage charge transfer elements.

7. The image pickup apparatus of claim 6, wherein said control means is operative to direct transfer of said residual charges immediately after activation of said shutter release means for discharge via said drain portion.

8. An image pickup apparatus comprising:

charge coupled solid-state image pickup means, for generating image signals of an image, having picture elements of first and second fields coupled to vertical charge transfer lines which accumulate signal charges of said picture elements which are thereafter transferred to storage charge transfer lines and later output as time series picture signals from a horizontal charge transfer line coupled to said storage charge transfer lines;

a mechanical shutter, disposed in front of said charge coupled solid-stage image pickup means, for exposing said picture elements; and timing control means, coupled to said charge coupled solid-state image pickup means and said mechanical shutter, for performing exposure so that said mechanical shutter is opened in response to a shutter release signal, generated by shutter release means, and closed immediately after completion of transfer of signal charges of said second field to said vertical charge transfer lines, which occurs after sequential transfer of signal charges of said first field to said vertical charge transfer lines and then to said storage charge transfer lines, to prevent smear.

* * * * *